United States Patent [19]

Brunskill

[11] Patent Number: 5,214,935
[45] Date of Patent: * Jun. 1, 1993

[54] FLUID CONDITIONING APPARATUS AND SYSTEM

[75] Inventor: Michael R. Brunskill, Rolling Hills Estates, Calif.

[73] Assignee: Allied-Signal Inc., Morris Township, Morris County, N.J.

[*] Notice: The portion of the term of this patent subsequent to Jun. 25, 2008 has been disclaimed.

[21] Appl. No.: 482,150

[22] Filed: Feb. 20, 1990

[51] Int. Cl.$^5$ .............................................. F25D 9/00
[52] U.S. Cl. ........................................ 62/402; 62/87; 62/80; 165/103; 165/166
[58] Field of Search .................. 165/54, 99, 103, 122, 165/166; 62/87, 402, 80

[56] References Cited

U.S. PATENT DOCUMENTS

| | | | |
|---|---|---|---|
| 1,872,794 | 8/1932 | Noblitt et al. | 165/99 |
| 2,045,002 | 6/1936 | Sperry | 165/99 |
| 2,178,894 | 11/1939 | Morgan | 165/99 |
| 2,197,172 | 4/1940 | Aufiero | 165/99 |
| 2,391,838 | 12/1945 | Kleinhans et al. | 165/103 |
| 2,485,590 | 10/1949 | Green | 62/87 |
| 2,766,968 | 10/1956 | Blizard . | |
| 3,161,234 | 12/1964 | Rannenberg . | |
| 3,196,942 | 7/1965 | Prentiss . | |
| 3,224,842 | 1/1963 | Manske . | |
| 3,262,496 | 7/1966 | Bawabe . | |
| 3,618,659 | 11/1971 | Rawal . | |
| 3,627,033 | 12/1971 | Ringquist | 165/103 |
| 3,716,097 | 2/1973 | Kelp et al. . | |
| 3,878,692 | 4/1975 | Steves | 62/402 |
| 3,963,070 | 6/1976 | Alley et al. . | |
| 3,980,129 | 9/1976 | Bergdahl . | |
| 3,983,191 | 9/1976 | Schauls . | |
| 4,198,830 | 4/1980 | Campbell . | |
| 4,244,422 | 1/1981 | Hallgren . | |
| 4,246,963 | 1/1981 | Anderson . | |
| 4,301,863 | 11/1981 | Bizzarro . | |
| 4,344,481 | 8/1982 | Urie et al. . | |
| 4,352,273 | 10/1982 | Kinsell et al. . | |
| 4,507,939 | 4/1985 | Wieland . | |
| 4,579,163 | 4/1986 | Maendel . | |
| 4,580,406 | 4/1986 | Nims | 62/87 |
| 4,623,019 | 11/1986 | Wiard . | |
| 4,645,001 | 2/1987 | Hillerstrom . | |
| 4,665,973 | 5/1987 | Limberg et al. | 62/402 |
| 4,712,611 | 12/1987 | Witzel . | |
| 4,829,775 | 5/1989 | Defrancesco . | |
| 4,862,952 | 9/1989 | Tarasewich et al. | 165/54 |
| 5,025,642 | 6/1991 | Brunskill et al. | 62/402 |

FOREIGN PATENT DOCUMENTS

| | | | |
|---|---|---|---|
| 687482 | 5/1964 | Canada | 62/87 |
| 0341663 | 11/1989 | European Pat. Off. . | |
| 2456521 | 8/1976 | Fed. Rep. of Germany | 165/122 |
| 867214 | 5/1961 | United Kingdom . | |

Primary Examiner—John K. Ford
Attorney, Agent, or Firm—James W. McFarland; Robert A. Walsh

[57] ABSTRACT

A system for conditioning working fluid in environmental control systems includes arrangements for minimizing icing from a variable flow velocity turbine exit flow at subfreezing conditions, wherein the turbine is very closely located to the downstream heat exchanger, including a backpressure plate for minimizing flow velocity stratification, an internal bypass passage arranged to produce a relatively predictable bypass flow ratio regardless of the flow velocity stratification, and other anti-icing techniques.

6 Claims, 7 Drawing Sheets

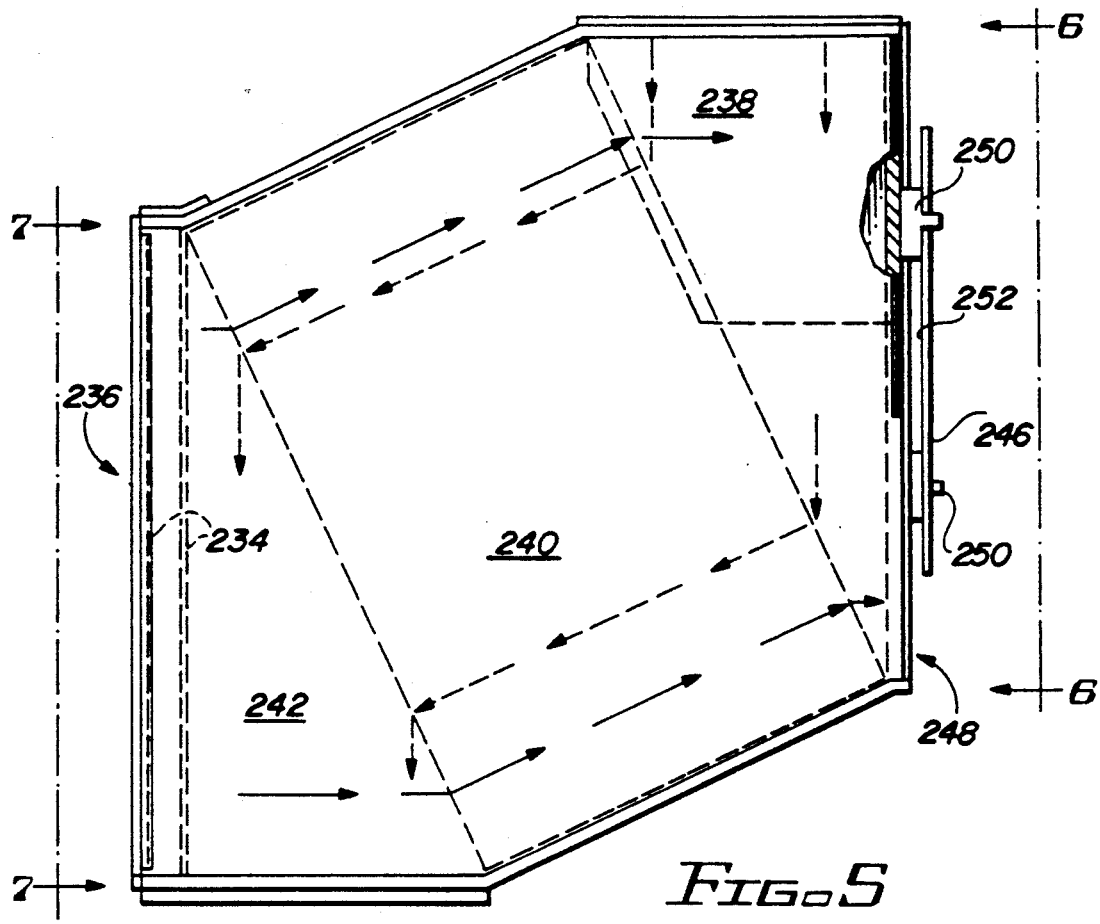
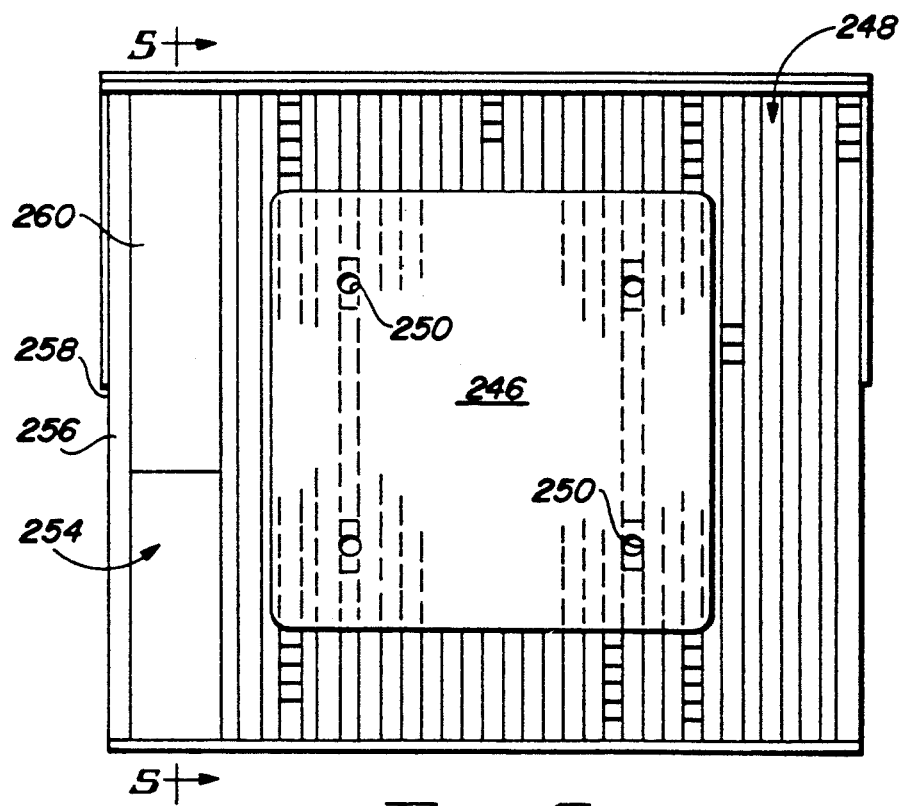

FLUID CONDITIONING APPARATUS AND SYSTEM

The United States Government has rights in this invention in accord with the provision of Contract No. N00019-85-C-0145 with the United States Navy.

CROSS-REFERENCE TO RELATED APPLICATION

Subject matter common to that disclosed herein is also contained in commonly assigned U.S. patent application Ser. No. 482,382 filed simultaneously herewith and entitled "Fluid Conditioning Apparatus And System".

BACKGROUND OF THE INVENTION

1. Field of the Invention

This invention pertains to the art of fluid conditioning apparatus, systems and methods, and is more particularly concerned with improvements for preventing excessive ice formation at the cold fluid inlet of heat exchangers in these systems, as well as for providing improved heating capacity utilizing the heat transfer performance capabilities of heat exchangers. These apparatus are most commonly used, but are not limited to, environmental control systems for air and ground vehicles, both military and commercial.

2. Description of Prior Art

Examples of arrangements for preventing excessive ice formation are described in three patents. The first is U.S. Pat. No. 4,198,830 dated Apr. 20, 1980, of Carl D. Campbell, and entitled "Fluid Conditioning System And Apparatus". The second is U.S. Pat. No. 4,246,963 dated Jan. 27, 1981, of Alexander Anderson, and entitled "Heat Exchanger". The third is U.S. Pat. No. 4,352,273 dated Oct. 5, 1982, of Robert C. Kinsell et al, and entitled "Fluid Conditioning Apparatus And System". All of the above patents are assigned to the same assignee as that of the present invention.

Briefly stated, the Campbell invention provides a means to condense water out of the working fluid of an air-cycle environmental control system while the fluid (air) was still at high pressure, eliminating the need for coalescer bags which require significant maintenance. A problem with ice formation on the face of the heat exchanger in line with the discharge of the expansion turbine was addressed by the Anderson invention which proposed the addition of hot header bars, not connected to the cold passages, for improved ice prevention characteristics of the heat exchanger. The Anderson invention also detailed the heat transfer relationship between the hot and the cold side fins necessary to maintain metal temperatures above freezing. The Kinsell et al invention provides for the substantial lowering of the expansion turbine discharge air temperature and an associated increase in the delivered cooling capacity of a typical apparatus by adding a bypass in the middle of the heat exchanger.

In addition to the type of air cycle environmental control system (ECS) described in those patents, the present invention is useful in an ECS system variation wherein condensing heat exchanger is used to achieve extra heating capacity in a combined ECS, nuclear-biological contaminant filtration system while maintaining the proper environmental conditions at the filter inlet. This cycle also relies on the three previously described patents for the prevention of ice in subfreezing condensers. The above inventions have found successful application in both commercial and military air and ground vehicle environmental control systems However, the methods described above for controlling the formation of ice have normally required additional, active methods of ice control.

Applications of the Anderson invention have shown that the performance of the condenser heat exchanger changes dramatically with changes in operating conditions, specifically turbine discharge velocities. This is due to the design of the heat exchanger cores described in the Anderson invention. The variation in performance is due to the very low pressure loss of the condenser core relative to the manifold pressure losses. In other heat exchangers, core pressure losses are typically 80% of the flange-to-flange pressure loss to ensure proper flow distribution through the heat exchanger. The Anderson invention provides for very loose fins on the cold side passage of the heat exchanger to prevent the accumulation of ice by reducing the blockage of the flow path and by biasing the metal temperatures closer to the hot side than the cold side. The resulting design is therefore very sensitive to flow stratification at the condenser cold side inlet.

Testing of various systems utilizing the referenced inventions has shown that, when the turbine is close-coupled to the condenser, as it is in most systems, changes in turbine exit velocity produce significant changes in the flow and temperature stratification of the condenser cold side inlet.

SUMMARY OF THE INVENTION

An important aspect of the present invention is a postulation that this above-described stratification produces significant deviations from predictions of metal temperatures for these prior arrangements. The concentration of cold air from the turbine exhaust in the center of the condenser core results in lower than predicted metal temperatures locally, and the formation of ice when no ice is predicted. This is believed to be a primary reason for use of secondary, active de-icing devices in these systems. Additionally, the amount of heat transfer produced by the heat exchanger varies significantly from predictions in which stratification are not accounted for, resulting in oversized condensers to meet water removal or heating requirements. Also, there is a problem with the predictability of heat exchanger performance in off-design conditions where turbine exit velocities vary significantly from design cases.

With these problems in mind, the present invention is intended to eliminate the variation in condenser heat transfer performance while retaining the benefits of the Anderson invention for ice protection. This will allow the Campbell, Anderson and Limberg inventions to function properly in typical aircraft installations where the condenser heat exchanger of an air-cycle system is close-coupled to the expansion turbine. This will also allow repeatability and predictability in performance predictions in off-design conditions.

More particularly, the present invention recognizes that the condenser heat exchanger described above, in order to perform consistently and avoid excessive ice formation in conditions of inlet stratification experienced when close-coupled to the turbine exit, must be designed in such a manner that the inlet air is properly distributed to the cold side inlet of the heat exchanger.

The apparatus and method of the present invention for distributing the inlet flow, comprises a backpressure plate attached to the back of the condenser heat exchanger core, which is offset from the core to allow flow through all passages. The design of this plate is such that the overall pressure loss of the condenser is higher than without the plate, allowing the retention of the hot and cold fin heat transfer relationship described in the Anderson invention. By placing the plate on the back side of the core, the turbine exit air has been reheated in the condenser heat exchanger and therefore the plate will not collect ice. The resultant effective flow area of the core is less than the inlet manifolds, and this results in a more normal relationship between core and manifold pressure losses.

Another important aspect of the present invention is the recognition that such flow stratification may have a significant impact in the operational aspects of an integral bypass duct or gap configuration as taught in the Kinsell et al patent. Testing with the Limberg invention has shown that, when the turbine is close-coupled to the condenser, as it is in most systems, changes in turbine exit velocity produce significant changes in the flow and temperature stratification of the condenser cold side inlet. This stratification produces significant variation in the percentage of flow passing through the gap.

With this problem in mind, this invention is intended to eliminate the variation in condenser bypass ratio while retaining the benefits of the Kinsell invention for ice protection. This will allow functioning, repeatability, and predictablity in performance predictions in the systems. More specifically, the invention recognizes that the condenser gap described above, in order to perform consistently in conditions of inlet stratification experienced when close-coupled to the turbine exit, must be placed in such a manner that the gap is outside of the turbine exit high velocity area, so that changes in the turbine exit velocity will have minimal impact on the designed condenser bypass ratio. Testing has shown that an internal location of the gap on the extreme side of the condenser, rather than in the middle, accomplishes this purpose. In order to keep the outside wall of the gap from freezing, a small, one-pass heat exchanger is required to keep the metal temperatures sufficiently warm.

Another aspect of the present invention is improved bypass duct capacity while avoiding icing therein. Specifically, inclusion of a closure plate over a part of the bypass duct, near its exit, but in a manner avoiding reduction in size of the smallest dimension of the duct, allows lower bypass ratios without increasing ice formation. Additionally, the present invention contemplates anti-icing by the convenient utilization of hot, waste fluid flow from the system, such as exhaust flow from fluid film foil bearings.

These and other objects and advantages of the present invention are specifically set forth in, or will become apparent from the following detailed description of the preferred arrangement, when read in conjunction with the accompanying drawings.

BRIEF DESCRIPTION OF THE DRAWINGS

FIG. 5 is an enlarged cross-sectional, front elevational view of the core portion of heat exchanger 14 with the fluid plenum casings thereof not shown, as viewed generally along lines 5—5 of FIG. 6;

FIG. 6 is a right side elevational view of the outlet portion of the heat exchanger core as viewed along line 6—6 of FIG. 5;

DETAILED DESCRIPTION OF THE PREFERRED EMBODIMENT

Figure 1:
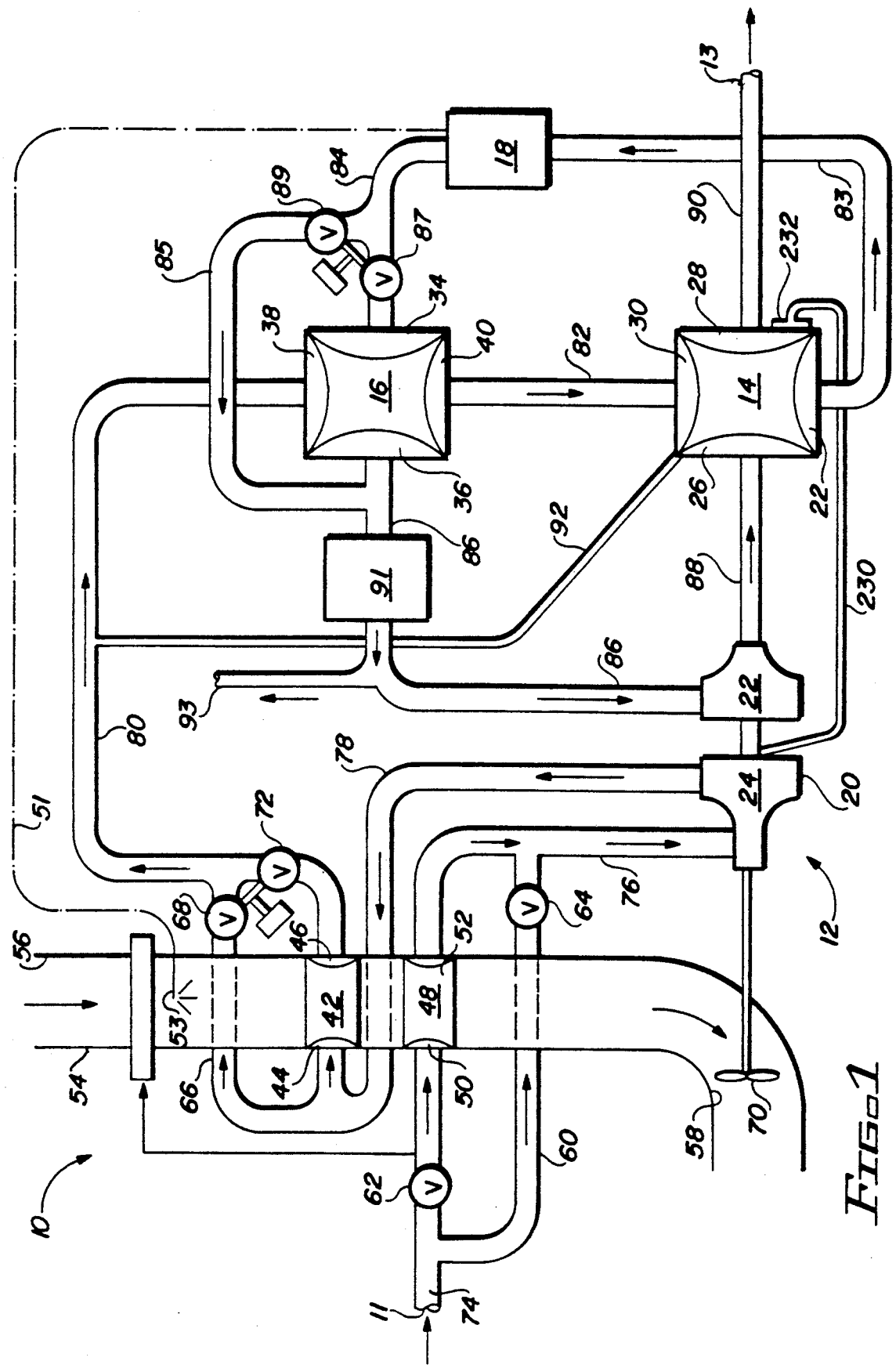
FIG. 1 is a schematic representation of a fluid conditioning system embodying the principles of the present invention.
Figure 2:
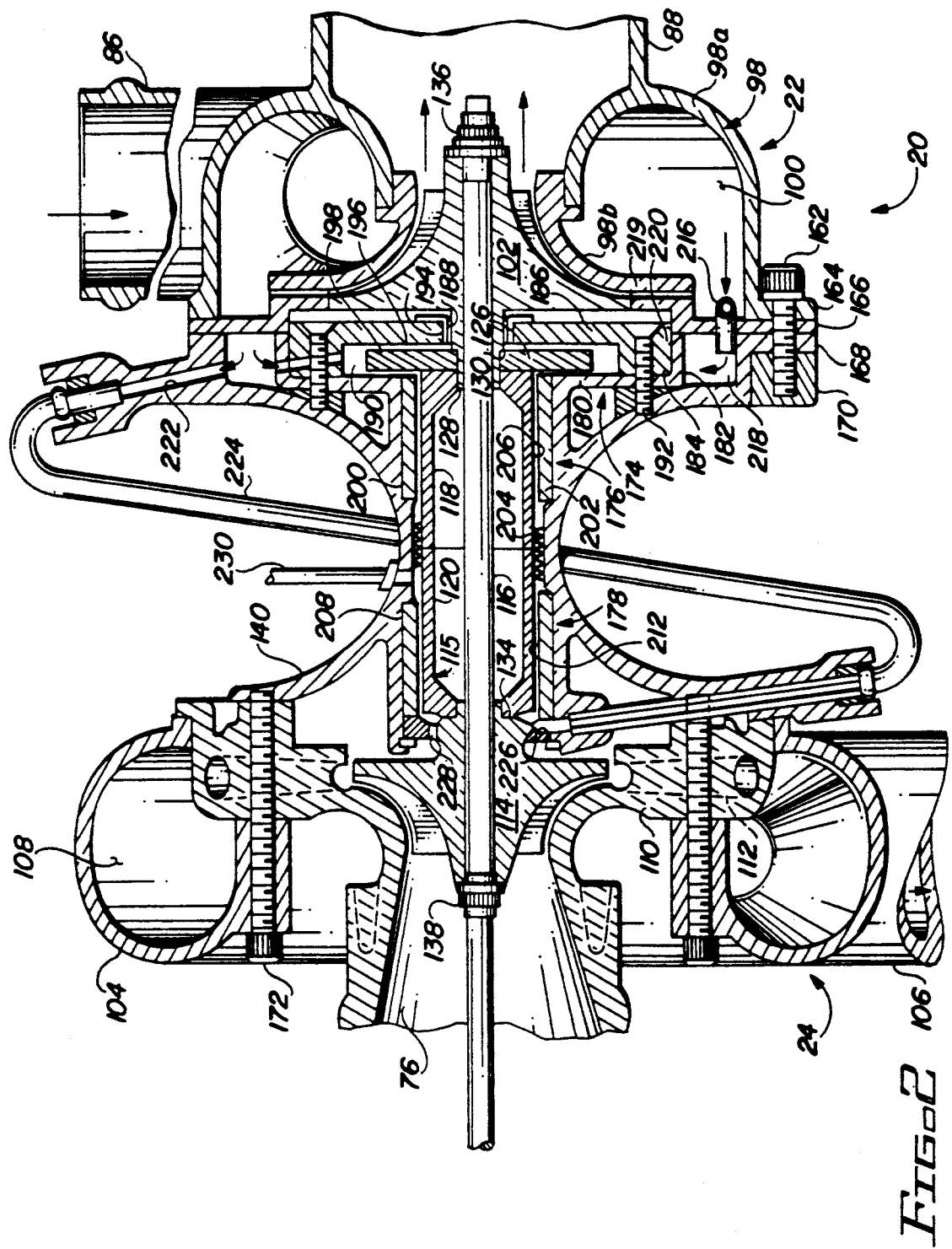
FIG. 2 is a partial, cross-sectional elevational view of the air cycle machine 20.

One form of the apparatus of the invention, and one form of the system employing the apparatus, is illustrated on FIG. 1 wherein the system 10 for the conditioning of the air supplied from a source to an inlet 11, a point of use as, for example, the cabin of the aircraft, through an outlet 13, employs an apparatus 12 comprised of a first heat exchange means 14, a second heat exchange means 16, a water trap or separator 18 and an air cycle machine 20. The machine 20 is of the three-wheel type generally known in the art, comprising an air expansion turbine 22 and a centrifugal type air compressor 24 with the turbine and the compressor wheels mounted on a common rotatable shaft, together with a fan wheel. The air cycle machine structure is described in greater detail below with respect to FIG. 2.

The heat exchange means 14 in its preferred form is of the type familiarly known in the art as a counterflow plate-fin device having fin means (not shown on FIG. 1) defining a first fluid passageway means separated by plate means (also not shown on FIG. 1) from a second passageway means defined by counterflow-disposed fins (also not shown). Fluid flowing from a chamber defined by the plenum casing 26 through the first passageway means enters a chamber defined by a plenum casing 28 after having been in heat exchange relationship with fluid flowing through the second passageway means from a chamber defined by the plenum casing 30 and entering a chamber formed by the plenum casing 32. The counterflow plate-fin-device 14 is described in greater detail hereinbelow with respect to FIGS. 3-8.

The heat exchange means 16 is similar to the heat exchange means 14, having similar means forming third and fourth passageway means for fluids in heat exchange relationship, with the exception that heat exchange means 16 is of the type commonly referred to as a cross-flow heat exchanger. Fluid flowing from a chamber defined by the plenum casing 34 through the third passageway means enters a chamber defined by the plenum casing 36. Similarly, fluid flowing from a chamber defined by the plenum casing 38 through the fourth passageway means enters a chamber defined by the plenum casing 40.

A third heat exchange means 42 commonly designated as a secondary heat exchanger which is also preferably of the cross-flow plate-fin type defines a fifth passageway means for the flow of fluid from a chamber defined by the plenum casing 44 through the fifth passageway means to the chamber defined by the plenum casing 46. The flow path over the fifth passageway means defines a sixth passageway means of the heat exchange means 42.

A fourth heat exchange means 48, commonly designated as a primary heat exchanger, which is likewise of the cross-flow plate-fin type, defines a seventh passageway means for the flow of fluid from a chamber defined by the plenum casing 50 through the seventh passageway means to the chamber defined by the plenum casing 52. The flow path through the seventh passageway means defines an eighth passageway means of the heat exchange means 48.

A duct 54 defines a passageway for coolant fluid admitted at the upper end 56 and discharged at the lower end 58 thereof. As used in aircraft, the duct 54 would be disposed to conduct coolant ram air from ambient through the sixth and eighth passageways of the heat exchange means 42 and 48.

Forced flow of the ambient coolant air flow through the duct 54 when the ram effect is insufficient (as, for example, with the aircraft stationary on the ground) is achieved, for example, fan wheel 70 disposed on the outboard end of the output power shaft of the air cycle machine 20, fan 70 serves to pump the air from the inlet end 56 through the outlet end 58 of the duct 54 in known fashion, causing cooling air to flow through the said sixth and eighth passageways of the heat exchange means 42 and 48, respectively, in heat exchange relationship to the hotter working fluid in the said fifth and seventh passageways.

To enhance the cooling effect of the cooling air flowing through the duct 54, water evaporation means therein may be employed. To this end there is provided a water conducting pipe 51 whose inlet is coupled to the trap 18 to conduct water therefrom to a supply nozzle 53 disposed in the duct 54 upstream from the cooling passes of the heat exchanger means 42 and 48.

Working fluid from the exterior source (and which may be initially pressurized thereat) is caused to enter the system 10 through an inlet duct 74, through plenum casing 50, and thence into the seventh passageway means of the fourth heat exchange means 48, and thereafter through a duct 76 to the inlet of the compressor 24. From the exhaust of the compressor, the air, which has been compressed and heated even more therein, is conducted by a duct 78 to the fifth passageway means of the heat exchange means 42 and thence through plenum casing 46 and duct 80 to heat exchange means 16.

For temperature regulation, a bypass passage 60 extends from duct 74 to duct 76 in parallel to the primary heat exchanger 48, and mixing valves 62,64 may be variably adjusted to control the relative airflow rates through the two parallel paths and thereby adjust temperature of airflow reaching compressor 24. Similarly, a bypass passage 66 extends from duct 78 to duct 80 in parallel to the secondary heat exchanger 42, and mixing valves 68,72 may be variably adjusted to control the relative airflow rates through these two parallel paths to control the temperature of airflow reaching plenum casing 38. As shown, a single actuator 71 may be used to simultaneously further open one and close the other of valves 68,72.

It will be seen that the source working air which reaches this point of the plenum casing 38 of the heat exchange means 16 has been cooled in the heat exchange means 48, heated by the compressor 24 and then cooled in the heat exchange means 42, substantially to the extent of the amount of the heat of compression imparted thereto by the compressor 24. The heat exchange means 16 may also be designated as a reheater means since the pressurized hot source air entering the fourth passageway means thereof gives up heat to the fluid flowing through the third passageway means thereof. The cooled high pressure air is thereafter conducted by a duct 82 to the inlet of the plenum casing 30 and thence into the second passageway means of the first heat exchange means 14 wherein further cooling occurs by the fluid flowing in the first passageway means thereof. At this point a condensation of the water (entrained in vapor form in the source air) occurs. Thus, the first heat exchange means 14 also may be designated as a condenser means.

The cooled air and entrained water droplets and mist then flow through a duct 83 from the condenser means 14 to the water trap or separator 18 wherein substantially or nearly all of the condensed water is removed, with the relatively dry air then flowing through a duct 84 to the inlet of the plenum casing 34 and thence into the third passageway means of the reheater means 16 where it is again heated by the hot source fluid in the fourth passageway thereof, as aforesaid. A parallel bypass passage 85 extends from duct 84 in non-heat exchange, non-heated relationship to reheater 16, to control the temperature of airflow delivered to downstream duct 86. As before with respect to bypasses 60 and 66, a pair of valves 87,89 variably control airflow to plenum casing 34 and bypass 85 (as by a single actuator as illustrated if desired) for temperature control.

Interposed in duct 86 is a filter means 91 for extraction of certain contaminants from the airflow prior to its introduction into habitable airspace. An example of such a filter would be a charcoal type filter for absorption of biological or nuclear contaminants. Such type filters have a life and efficiency highly sensitive to temperature and humidity, requiring in the environmental control system of the type illustrated in FIG. 1, that the filter be located downstream of reheater 16. Even so, in certain operating conditions the temperature of airflow exiting plenum 36 of the reheater could become excessive, requiring use of bypass 85 to limit temperature of airflow in duct 86. Additional effects of the necessarily limited temperature environs for filter 91 are discussed in greater detail below.

Upon exiting filter 91, a small portion of the airflow may be diverted from duct 86 to a secondary outlet 93. As well known to those skilled in the art, outlet 93 may extend to an oxygen-nitrogen generator (not shown) which operates through reverse osmosis processes to create oxygen-enriched and nitrogen-enriched airflows for other uses within the aircraft environment.

From filter 91 the relatively hot airflow passes to the inlet of the expansion turbine 22 where it is expanded and cooled to a point consistent with the energy imparted by the turbine 22 to the compressor 24 and the fan wheel 70. As will be apparent to those skilled in the art, the turbine and compressor operate in what is familiarly known as boot strap fashion.

From the outlet of the turbine 22 the cooled air is conducted by a duct 88 to the plenum casing 26 of the condenser 14 wherein the air flows through the said first passageway means to the chamber within the plenum casing 28 and into a duct 90 to thereafter be conducted to the point of usage as, for example, the cabin air distribution system of the aforesaid passenger aircraft. Cold air in the first passageway means extracts such heat from the working fluid in the second passageway means as may be necessary to effect the condensation of water in the second passageway means as aforesaid.

In accord with U.S. Pat. No. 4,246,963, condenser 14 is of the type having hollowed, heated header bars traversing the cold air inlet adjacent plenum 26. A duct 92 therefore extends from duct 80 to these header bars (not shown in FIG. 1) to pass a portion of hot air therethrough to assist in preventing excessive ice formation. As known, the de-icing flow from duct 92 and the header bars is discharged into plenum 32 to mix with the cooler air therein flown from the second passageway means.

The system illustrated in FIG. 1 is of the type wherein all airflow to pass into the habitable space from outlet 13 is routed through the above-described flow path in FIG. 1. Thus, for example, all airflow is thereby treated by filter 91. Heat exchanger 14 is therefore necessarily sized to accomplish two purposes: condensation of the moisture in the hot airflow passing from plenum casing 30 to plenum casing 32 as discussed above; and also to accomplish significant heating of the subfreezing airflow that enters plenum casing 26 so as to produce the desired temperature at outlet 13. This heating function requires a substantially greater size (e.g., three-times size) heat exchanger 14 than required merely for the condensation function. Because of this relatively large heat exchange size, the usual passive manners of preventing ice formation within heat exchanger 14 (e.g., those taught by Anderson U.S. Pat. No. 4,246,963 and Kinsell U.S. Pat. No. 4,352,273) do not produce fully acceptable results throughout the operating envelope of the system of FIG. 1. At the same time overall system efficiency is maintained by essentially always producing subfreezing outlet flow in duct 88. Further, tendency toward icing in heat exchanger 14 is also increased because of the close coupling of turbine 22 to plenum casing 26 to reduce the length of duct 88 to minimize icing in the latter (and accordingly minimize de-icing techniques for duct 88 itself).

It is to be understood that, as used herein, the description of the FIG. 1 system as being one in which "all" fluid flow passes through filter 91, refers to the FIG. 1 system in its filter-operating functional mode and the associated heating function for heat exchanger 14. Specifically, it is within the scope of the invention and the terms defined in this paragraph, that a selective bypass of filter 91 may be included to modulate the duty cycle thereof to increase its life. Such, of course, does not alter the capacity requirement of heat exchanger 14.

While heat exchanger 14 is discussed in greater detail below, one aspect of passive anti-icing control is accomplished by delivery of an otherwise waste-heat airflow through a passage 230 extending from the air cycle cooling machine 20 to a warming chamber 232 on casing 28. To more fully explain the source of the heating flow in passage 230, the construction and operation of the improved air cycle cooling machine 20 will now be described in greater detail by reference to FIG. 2. The turbine means 22 includes a hollow, generally cylindrical housing 98 into which the turbine inlet duct 86 enters generally tangentially, and from which the turbine outlet portion 88 centrally extends in an axial direction. Housing 98 comprises axially outer and inner portions 98a, 98b and has defined therein a generally annular inlet passage 100 which circumscribes a bladed turbine wheel 102 and communicates with the turbine inlet 86. The compressor means 24 comprises a hollow, generally cylindrical housing 104 into which the inlet duct 76 axially enters and from which an outlet 106 generally tangentially extends to communicate with the duct 78 of FIG. 1. Housing 104 has defined therein an annular discharge passage 108 which circumscribes an annular diffuser section 110 having formed therein an annular array of generally radially extending diffuser passages 112. Passages 112 extend between the inlet and discharge passages 76, 108 and circumscribe the discharge end of a bladed compressor impeller 114.

Shaft means 115, which extends between the mutually spaced turbine wheel 102 and compressor impeller 114, include a main or inner shaft 116 which extends at its left end through turbine wheel 102, and at its right end through the compressor impeller 114. The shaft means also includes a first hollow outer shaft portion 118 fixedly connected to a second hollow outer shaft portion 120. Shaft portion 118 coaxially circumscribes the inner shaft 116 and extends from portion 120 to a radially inner portion of an annular bearing runner plate 126 (having a function subsequently described). Plate 126, as well as a right end portion of outer shaft portion 118, has extended therethrough an axially inner end portion 128 of turbine wheel 102, the plate 126 bearing against an annular shoulder 130 formed on impeller 102. Outer shaft portion 120 extends between portion 118 and an annular shoulder 134 on the compressor impeller 114.

The turbine wheel 102, bearing plate 126, outer shaft portions 118, 120, and compressor 114 are frictionally locked together for conjoint rotation by means of a pair of tightening nuts 136, 138 which threadingly engage the outer ends of the inner shaft 116 and respectively bear against the outer ends of the turbine wheel 102 and the compressor impeller 114. As these nuts are tightened, the turbine wheel 102 and compressor impeller 114 are forced inwardly along shaft 116, in turn forcing the outer shaft portions 118, 120 into frictional interengagement. In this manner the shaft means 60 are frictionally locked to the turbine, fan and compressor elements of the air cycle machine 20.

Figure 4:
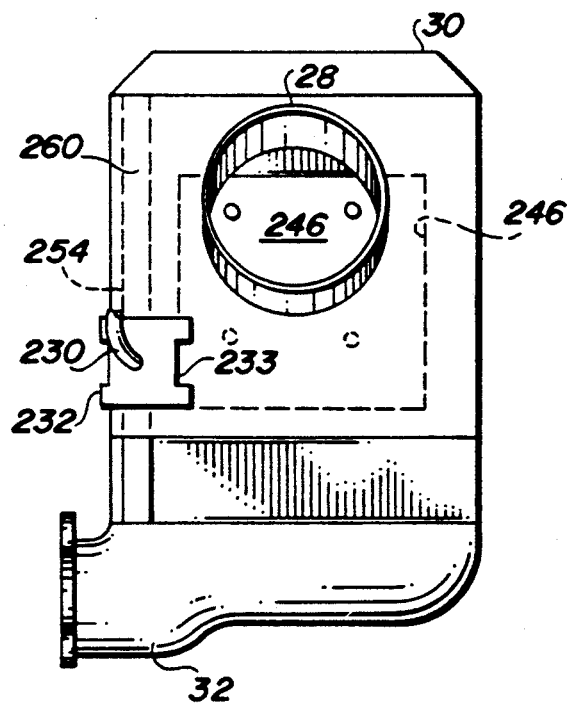
FIG. 4 is a right side elevational view, taken along lines 4—4 of FIG. 3.

Extending completely between the turbine housing 98 and the compressor housing 104, and circumscribing the shaft means 60, is a hollow housing 140. The housing 140 is secured to the turbine housing 98 by an annular array of bolts 162 (only one of which is shown in FIG. 4) which extends successively through annular flanges 164, 166, the turbine housing 98, and annular flanges 168, 170 on housing 140. At the opposite end of the air cycle machine 20 the compressor housing 104 is secured to housing 140 by an annular array f bolts 172 which extend successively through the compressor housing 104, the diffuser 110 and into the housing 140.

This arrangement and joining method very advantageously permits the turbine inlet 86 and compressor outlet 106 to be "clocked" (i.e., rotationally oriented) relative to each other in a wide variety of manners, thereby affording great installation flexibility to the cooling machine 20.

A gas foil bearing system supports the shaft means 115 and is continuously lubricated by a portion of the airflow inlet passage 100 used to rotationally drive the turbine 102 and compressor 114. The bearing system comprises a gas foil thrust bearing 174 positioned between the turbine wheel 102 and the right end of outer shaft section 118, a gas foil journal bearing 176 positioned at the right end of shaft section 118, and a gas foil journal bearing 178 positioned at the left end of outer shaft section 120. The gas foil bearings 174, 176 and 178 are each generally similar in construction to those illustrated and described in U.S. Pat. No. 3,615,121.

Foil bearing 174 comprises an annular inner thrust plate 180 which is defined by a radially inner right end portion of housing 140 and circumscribes the right end of outer shaft section 118. Plate 180 has a rightwardly extending annular lip 182 which overlies a leftwardly extending annular lip 184 on an annular outer thrust plate 186 that circumscribes a narrow neck portion 188 of the turbine wheel immediately to the right of shoulder 130. Plate 186 is positioned to the right of plate 180, defining therewith an annular passage 190, and is secured around its periphery to the housing 140 by an annular array of bolts 192. Operatively positioned between the turbine wheel neck 188 and the thrust plate 186 is an annular knife-edged labyrinth seal 194. The annular runner plate 126 extends in a radial direction partially into the annular passage 190. Plate 126 is slightly thinner than the thickness of passage 190, thereby defining with plates 180 and 186 an annular clearance space 196 between plates 186 and 126, and an annular clearance space 198 between plates 126 and 180. Operatively positioned in each of the clearance spaces 196,198 is an annular array of overlapping foil elements (not shown) which function during operation of the gas foil thrust bearing 174 as described in the referenced U.S. Pat. No. 3,615,121.

Gas foil journal bearing 176 comprises a cylindrical bushing 200 which coaxially circumscribes a right end portion of the outer shaft section 118 and is press-fitted into a circular bore 202 formed in the housing 140. Interposed between housing 140 and shaft section 118 immediately to the left of bushing 200 is an annular knife-edged labyrinth seal 204. The inner diameter of bushing 200 is slightly larger than the portion of shaft section 118 which it circumscribes, and defines therewith an annular clearance space 206 which communicates at its right end with a radially inner annular portion of clearance space 198. Operatively positioned within clearance space 206 is an annular array of overlapping foil elements (not shown) which function during rotation of the shaft means 115 as described in the referenced patent.

Gas foil journal bearing 178 is similar in construction and operation to bearing 176 and comprises a bushing 208 press-fitted into a circular bore in housing 140, circumscribing a left end portion of outer shaft section 120 and defining therewith an annular clearance space 212 in which is operatively positioned an annular array of foil elements (not shown). Interposed between housing 140 and shaft section 120 immediately to the right of bushing 208 is the annular knife-edged labyrinth seal 104.

The gas foil bearing system (i.e., bearings 174, 176 and 178) is lubricated, and provided with the necessary hydrodynamic supporting force, by the use of bleed air from passage 100 in the following manner. A small portion of the pressurized bleed air entering the turbine housing inlet passage 100 is forced, via a small transfer tube 216, into an annular passage 218 which is defined between the turbine housing and fan housing sections 98b, 140 and circumscribes the flange lip 182. The balance of the bleed air entering inlet passage 100 is forced radially inwardly through turbine nozzle openings 219 and through the bladed portion of turbine wheel 102, becoming the cooling air upon its exit from the wheel to duct 88. From passage 218 bleed air is forced, via an annular series of bores 220 formed through the abutting flange lips 182, 184, into a radially outer portion of the annular passage 190. Bleed air entering passage 190 is sequentially forced through thrust bearing clearance spaces 196, 198, through the journal bearing clearance space 206 to the labyrinth seal 204.

Another portion of the bleed air entering the passage 218 is forced, via a bore 222 in housing section 140 into one end of a transfer conduit 224 which communicates at its opposite end with a small transfer passage 226. Transfer passage 226 communicates with an annular passage 228 which, in turn, communicates with the journal bearing clearance space 212. Bleed air entering transfer passage 228 is sequentially forced into the annular passage 228, through the clearance space 212 to the labyrinth seal 204.

The airflow in clearance space 212 functioning with the gas foil bearing thereof experiences substantial heating prior to exhausting from the bearing and the housing 140 to passageway 230. This relatively hot, waste airflow is directed to the heat exchanger 14 as described above with respect to FIG. 1 for anti-icing purposes.

Figure 3:
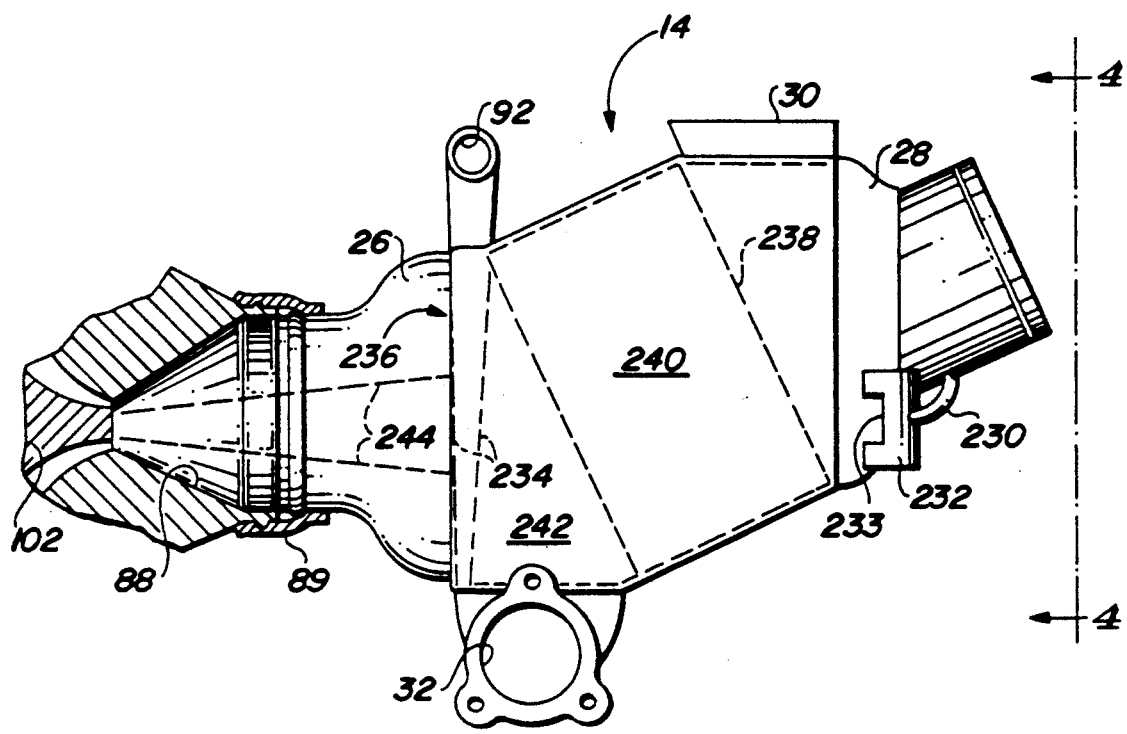
FIG. 3 is a partially schematic, partial front elevational view of the condenser heat exchanger 14.

Returning now again to the heat exchange means 14, this heat exchanger is shown in greater detail in FIGS. 3–7. As best shown in FIG. 3, the exit duct 88 from the turbine 102 is very closely coupled to the inlet plenum casing 26 of heat exchanger 14. A sealed connection between the adjacent ends of duct 88 and plenum casing 26 may be provided by a sealing and closure element 89. The hollowed heated header bars are schematically illustrated in FIG. 3 by the dashed lines 234, and these header bars, supplied by heated air rom duct 92, are disposed adjacent the front face 236 of the heat exchanger core itself. The counterflow core of the heat exchanger is depicted by dashed lines in FIG. 3 with the flow from inlet plenum casing 26 passing from left to right in FIG. 3 to exit through plenum casing 28. The heated airflow from plenum casing 30 passes downwardly, with respect to FIG. 3, into the heat exchanger core to be turned in the triangular section 238 to then flow in direct counterflow relation to the other cool flow in the rectangular section 240, before then again being turned downwardly in the triangular section 242 to exhaust through the plenum casing 32. As such, the internal core configuration of the counterflow heat exchanger 14 is of conventional construction well-known to those skilled in the art. These triangular and rectangular sections 238, 240, and 242 are depicted by the associated dashed lines more completely in FIG. 5. The general direction of the cool flow passing from plenum 26 to plenum 28 is noted by the solid arrows in FIG. 5, while the relatively warm counterflowing air passing from plenum 30 to plenum 32 is depicted by the dashed arrows in FIG. 5 for clarity.

Figure 7:
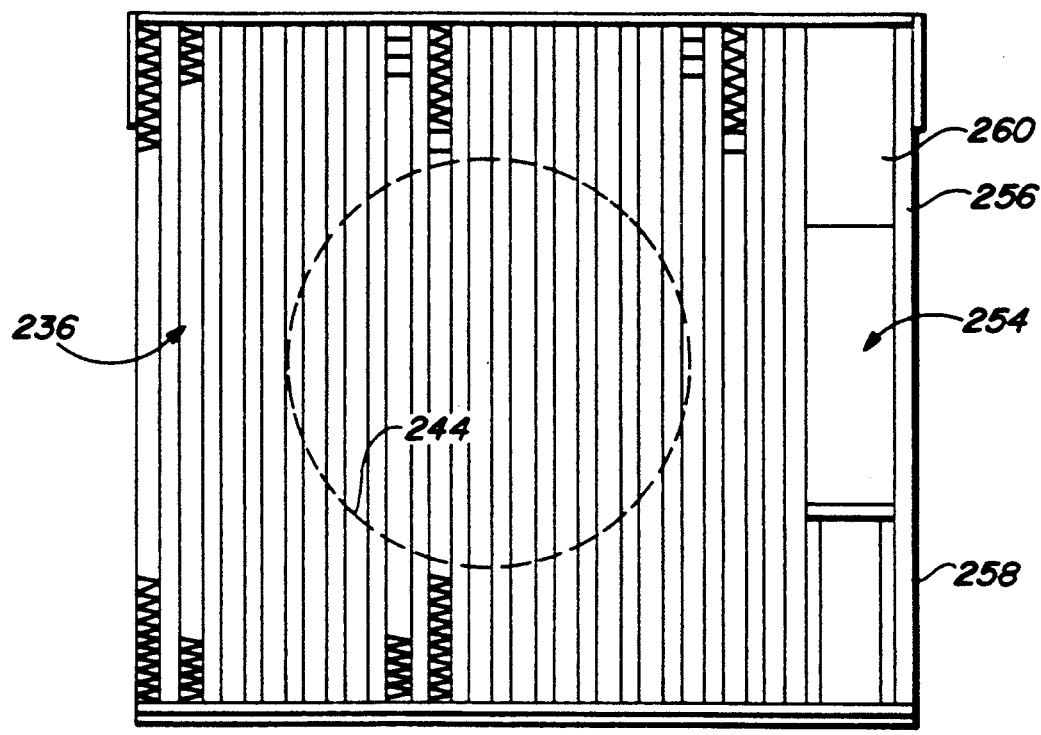
FIG. 7 is a left side elevational view of the inlet portion of the heat exchanger core as viewed along line 7—7 of FIG. 5.

As can be most clearly seen with respect to FIGS. 3 and 7, the relative close-coupling of the turbine 102 to the front face 236 of the heat exchange core has been found to cause a significant distribution of airflow velocities across the inlet face 236. As depicted by the conical dashed lines 244 in FIG. 3 and their associated circular projection as depicted in FIG. 7, a circular central portion of the face 236 receives the cold airflow from turbine 102 at highest velocities. Effectively the airflow in plenum casing 26 would be distributed somewhat in a Gaussian statistical distributional pattern across the face of inlet 236 with respect to the velocity thereof. In other words, the exhaust plume of airflow from turbine 120 produces a central area depicted by dashed lines 244 of high airflow velocity. More particularly, the characteristics of diffusion of the turbine exhaust would be similar to entrainment of a jet discharge into a plenum, where velocity and flow diffuses into the volume in the profile of Gaussian distribution curve. Accordingly the zone within the circular dashed lines 244 represent the bulk of the inlet flow (or the center of the Gaussian curve) and the highest velocity of airflow. Such distribution of the airflow presumes substantially zero or very low flow restriction through heat exchanger 14 with respect to the cold subfreezing airflow passing from plenum 26 to plenum 28. As a result, this same stratification of airflow would extend through the heater core.

It is quite clear therefore, by observation of FIG. 7, that a smaller circle 244 would result in less heat transfer, since a larger portion of the heat exchange core would be relatively starved of airflow. Conversely, a larger circle 244 would result in greater heat transfer as more and more airflow is spread across a greater percentage of the core. This distributional stratification, i.e. the circular pattern 244 is directly related, of course, to turbine exit velocity.

Turbine exit velocity can vary significantly throughout the duty cycle of the entire environmental control system. Testing has shown that when the turbine 102 is close-coupled to the heat exchanger 14, that changes in turbine exit velocity airflow produce significant changes in the flow and temperature stratification at the inlet face 236. This stratification produces significant deviations from expected predictions of metal temperatures. Specifically, the concentration of relatively cold air from the turbine exhaust within the zone bounded by dashed lines 244 results in lower than predicted metal temperatures at these locations. This therefore may create ice formation where otherwise ice would not be predicted. Additionally, the amount of heat transfer between the two counterflowing airflows varies significantly from predictions wherein such stratification exists. Typically this has been addressed in the prior art by a substantial increase or oversizing of the heat exchanger 14 to meet both water removal and heating requirements. Additionally, the predictability of the heat exchanger 14 performance at off-design conditions is extremely problematic where turbine exit velocities vary and are stratified as discussed above.

Accordingly, an important aspect of the present invention is the minimization of stratification of turbine velocities at inlet face 236 to avoid excessive ice formation. At the same time, since the turbine discharge flow rate may vary substantially in the FIG. 1 system to accommodate the various modes of operation thereof, the invention allows operation of the system by reducing ice formation in varying conditions of turbine discharge flow velocities. That is, as used herein, minimization of the flow velocity stratification encompasses actual reduction thereof, and/or increased variations in permitted turbine discharge velocities. One manner in which the present invention contemplates such a result is the inclusion of a backpressure plate 246, shown in FIGS. 4-6, disposed within the outlet plenum casing 28. More particularly, backpressure plate 28 is a relatively thin, rigid, flat metal plate secured adjacent to, but spaced slightly away from the back side face 248 of the heat exchange core. Backpressure plate 246 is offset a sufficient distance from face 248 to allow substantially unobstructed flow through all of the heat exchange core passages. As illustrated, it may be straightforwardly rigidly secured to back face 248 through securing elements 250.

The design, configuration and location of backpressure plate 246 is such that the overall pressure loss of the airflow passing from plenum casing 26 to plenum casing 28 is higher than would be experienced in the absence of plate 246, thereby allowing an increase in retention of the hot and cold airflows in heat transfer relationship inside the core of the heat exchanger, as well as increasing the retention time of the cold subfreezing air adjacent the hot header passages 234. Placement of plate 246 on the back side of the heat exchanger core assures that the airflow impacting the inside surface 252 of plate 246 has experienced substantial warming so that plate 246 itself will not tend to collect ice. Inclusion of backpressure plate 246 covering a substantial portion of the rear face 248 has been observed to produce an improved airflow distribution (i.e., reduction of the stratification as depicted by the dashed circle 244) so that more correct predictions of heat transfer performance and metal temperatures within the interior core of the heat exchanger 14 can be predicted. Three factors considered together determine the amount of blockage required (that is the size required of backpressure plate 246) to accomplish the desired goals of increased airflow retention time and reduced flow velocity stratification across the front face thereof. Specifically, these three factors include the distance between turbine 102 and core face 236, the pressure drop experienced across the core of the airflow passing from face 236 to face 248, and the turbine exit velocity. It is believed plate 254 would be effective in other specific systems if it covered at least 30 percent of face 248, or between about 30 percent and 80 percent of that face.

In a particular system, for example, backpressure plate 246 covering approximately sixty percent of the face 248 has resulted in sufficient blockage of the airflow to reduce the velocity stratification across face 236 to avoid localized initiation of icing thereon, improved heat exchange flow, and resulting overall acceptable operation of the system of FIG. 1. In that particular instance, the spacing between surfaces 248 and 252 was approximately five percent of the overall length of the heat exchange core extending from surface 236 to 248. As will be apparent to those skilled in the art, spacing between faces 248 and 252 is important to consideration of efficiency of the overall system sends a major component of pressure loss of the exiting airflow is in the turning loss of the air after it exits surface 248 and flows around plate 246, along with a second turning loss as this airflow rejoins the air exiting plenum casing 28.

The present invention further contemplates a modification and adaptation of the heat exchange apparatus as disclosed in Kinsell et al U.S. Pat. No. 4,352,273 entitled "Fluid Conditioning Apparatus And System". More particularly, the Kinsell et al patent discloses a heat exchanger having a bypass passage integrally constructed to be contained within the same heat exchange enclosure as the heater core carrying the primary flow. Such bypass duct of the Kinsell et al arrangement was found to dramatically improve the overall efficiency of the heat exchange arrangement by allowing lower subfreezing temperatures at the outlet for purposes of cooling, while at the same time anti-icing conditions were also improved inasmuch as the tendency toward icing in the primary passage increased the pressure drop therethrough to permit more air through the bypass. This therefore reduced the cold air traversing the heat exchange core while the same amount of warm air in the counterflowing passage ways was available. This increased the temperature of the primary airflow thereby reducing tendency towards initiation of icing. To the extent necessary reference may be made to the Kinsell et al patent for a more clear understanding thereof, and to the extent required the Kinsell et al patent is incorporated herein by reference.

The arrangement disclosed in the Kinsell et al patent is not directly applicable to the arrangement illustrated in FIGS. 1-7 because the turbine exit velocities may vary significantly when passing through its duty cycle of providing either cooling or heating exhaust airflow through outlet 13. In particular, during operational conditions of the environmental control system illustrated in FIG. 1 wherein there exists the greatest variation in turbine exit velocity from the standard design condition for heat exchanger 14, the percentage of bypass flow as would be introduced by the Kinsell et al concept, is most critical. This condition occurs during altitude heating condition when fan 70 is unloaded by ram air pressure in duct 54 and the lower density of airflow therethrough due to altitude, all combined with the fact that the backpressure on turbine 102 is also lowest at the same time. This is particularly true with respect to partially pressurized or unpressurized aircraft. In these conditions the air cycle machine 20 still operates at its highest normal speeds and therefore produces the highest turbine exit velocities.

The present invention solves these problems by structure to minimize variation in the bypass ratio of airflow passing from plenum casing 26 to plenum casing 28, while still retaining the anti-icing benefits as disclosed in the Kinsell et al patent. More particularly, this aspect of the present invention is accomplished by including a gap or bypass duct 254 in the core of heat exchanger 14 equivalent in function and operation to the gap or bypass duct disclosed in the Kinsell et al patent. Gap 254 is disposed at one extreme side of the heat exchanger core instead of being located generally in the center of the heat exchanger core as disclosed in the Kinsell et al patent. In this manner the present invention recognizes that the bypass duct or gap 254, in order to perform consistently in conditions of turbine inlet velocity stratifications caused by the close coupling of turbine 102 to inlet face 236, must be located so that the bypass duct is preferably outside the location of high velocity flow as experienced within the area circumscribed by the dashed line circle 244 in FIG. 7. By placement of bypass duct 254 to the extreme side of inlet face 236, the airflow velocity at this side location does not vary substantially even though turbine exhaust velocities may be varying dramatically. As a result the ratio of bypass flow passing through bypass duct 254, in comparison to the remainder of airflow passing through the heat exchange core in heat exchange relationship with the warming airflow, can remain predictable.

At the same time, to avoid freezing and additional icing conditions, a small one pass counterflow heat exchange passage 256 is contained between the bypass duct 54 and the outside sidewall 258 of the entire heat exchanger 14. The one pass passage 256 carries counterflowing warm air flow which is passing from plenum casing 30 to plenum casing 32, rather than carrying the cool flow passing from plenum casing 26 towards plenum casing 28.

Additionally, placement of bypass duct 254 immediately adjacent one sidewall of the heat exchange core and in non-alignment with the central inlet of the turbine airflow passing into inlet plenum 26, has been found to provide additional benefits. Specifically, high velocity ice particles which are normally entrained in the turbine exit velocity airflow will not normally reach the bypass duct 254. Such ice particles being more dense than the air carrying them, will tend to pass through the center portion of the heater core and will stay away from the bypass duct 254. This avoids tendency towards icing across bypass duct 254 which can bridge the gap thereof once ice tends to start accumulating within bypass duct 254.

In addition to improved predictability of heat exchanger operation because of the relative constancy of the bypass ratio because the airflow entering bypass duct 254 is far more predictable because it is outside the high velocity area 244, this aspect further improves the operation of the FIG. 1 arrangement by permitting a smaller size heat exchanger core in heat exchange means 14 due to the reduced bypass ratio permitted thereby. Specifically, with utilization of the side bypass passage 254, as turbine exit velocity increases, this effectively reduces the bypass ratio to actually improve the heating capability thereof. Accordingly, this aspect of the invention takes advantage of the fact that in the heating mode there is a higher turbine exit velocity (therefore more extreme velocity stratification) which is the situation in which the reduced bypass ratio for improved heating is desired.

Further modifications and adaptations to the internal bypass duct 254 have been discovered to improve the operational characteristics thereof such that the heat exchanger 14 may function not only as a condenser but also as a heating element, i.e. sufficiently sized to impart significant heat transfer to the exhaust flow through duct 13. More particularly, with respect to FIGS. 4-8, the bypass duct 254, in order to work properly, must be wide enough such that ice will not tend to initiate accumulation thereon. That is, the width of bypass duct 254 must be maintained sufficiently wide so as to prevent accumulation of ice that would eventually bridge the width thereof to close the bypass duct. On the other hand, the size of the bypass duct 254 directly relates to the heat transfer characteristics of heat exchanger 14. In other words, if the bypass duct 254 is too large, adequate heat transfer for condensation and water removal and other purposes will not be available short of a very significant increase in size and weight of the overall heat exchanger 14.

To therefore control and minimize the size of heat exchanger 14, the present invention contemplates inclusion of a closure plate 260 secured to the backside of gap 254 (i.e., in alignment with the plane of the exit face 248). Closure plate 260 is rigidly, sealingly, secured to the adjacent sidewalls of the bypass duct 254 so that the exhaust cross-sectional area of duct 254 is substantially reduced. In this manner, the bypass ratio may be reduced substantially, in comparison to the bypass ratio in the absence of closure plate 260, because of the reduced exit flow area thereof, thereby allowing lower rate of bypass flow through bypass duct 254 for a given turbine inlet velocity. Thus, while effectively reducing the bypass flow ratio, the width of passage 254 has, very importantly, not been reduced. In this manner, the bypass pressure ratio may be made smaller for a given size and configuration of heat exchanger 14 without increasing the possibility of ice accumulation within the bypass gap. For purposes of definition herein, the rectangular gap 254 is referred to as having a length direction running from face 236 to face 248, a height direction extending vertically in FIGS. 4, 6 and 7, and a width direction extending horizontally in FIGS. 4, 6 and 7.

Figure 8:
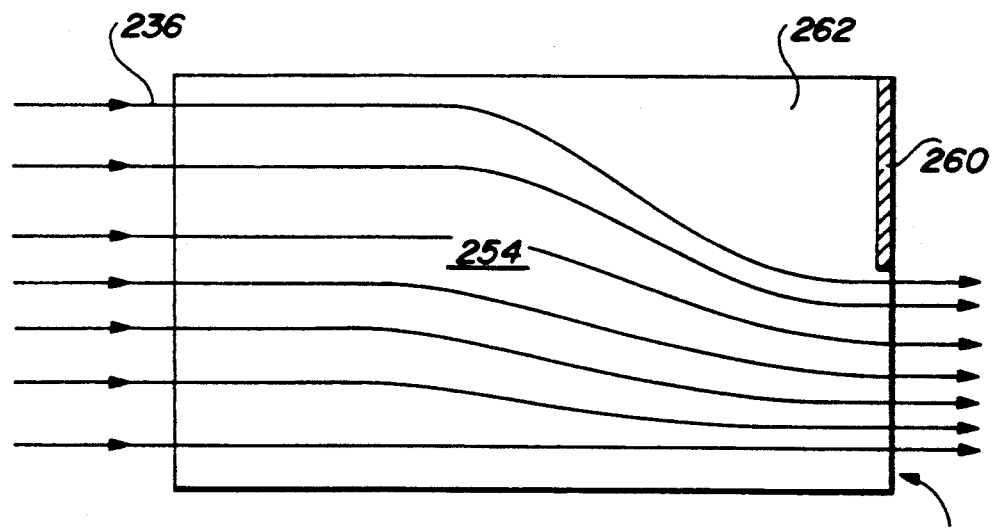
FIG. 8 is a schematic depiction of flow through bypass duct 254.

Also, it has been found to be important that the closure plate 260 be disposed at the rear end of bypass duct 254 rather than more nearly adjacent the inlet face 236. More specifically, at this rearward location closure plate 260 creates a static pressure region 262 immediately in front of plate 260 relative to airflow therethrough. As best depicted in FIG. 8, the bypass air is effectively "pushed around" the static pressure area 262 as shown by the arrows in FIG. 8. In doing so, the very cold bypass air, which may well contain ice particles, avoids impingement directly upon the exposed surface of plate 260 at high velocity. By avoiding impingement of ice particles at high velocity on the plate 260, accumulation of ice thereon is avoided. In other words, by avoiding or reducing impingement of the airflow directly upon surface 260, ice is prevented from forming thereon even though plate 260 is not directly warmed by any heating source.

In this manner, by carefully selecting the length of the closure plate 260, the bypass ratio may be selected to be substantially less than would be created by a gap 254 of equal width but without the closure plate 260. This dramatically improves the design flexibility for a given size heat exchanger 14. It is believed closure plate 260 can be effective through various lengths thereof from about 30 percent to 70 percent or more of the height of passage 254.

It will be apparent from the foregoing that the very cold bypass airflow passing through bypass duct 254 and exiting out the smaller portion opening thereof at face 248 will promptly come into contact with the aligned end face portion of plenum casing 28 and impinge directly thereon. As noted, such high velocity impingement of very cold air with, perhaps, entrained ice particles is strongly conducive to ice formation on the aligned portion of plenum casing 28. At the same time, design configuration constraints as well as minimization of pressure loss in the airflow dictates that the aligned portion of the plenum casing 28 cannot be remotely disposed from the opening of bypass duct 254. Accordingly, in the present invention the heating manifold 232 is disposed on the exterior surface of plenum casing 28 in alignment with the opening portion of bypass duct 254. The air exhausted from the air bearing system in the air cycle machine 20 is ducted through passage 230 into manifold 232 to create warming on the exterior surface of plenum casing 28 at this point of relatively cold, spot cooling by the bypass flow. In this manner the parasitic flow loss of the air bearing flow is utilized for "spot" warming of a cold location on the plenum casing 28. In this manner initiation of ice formation at this critical point on the interior of plenum casing 28 is avoided. Normally, the amount of air used for air bearing cooling is between 2-5 percent of the system airflow, and is adequate for maintaining the metal temperature at the cold spot location on plenum casing 28 above freezing. Air manifold 232 may be readily attached as by welding or mechanical attachment means at the desired cold spot location. Importantly the air manifold 232 has exit openings 233 so as to promote continuous flow of air through the air bearing system.

It will be apparent to those skilled in the at that the closure plate 260 may be utilized in a bypass duct which is located other than at the extreme side as illustrated in the preferred embodiment. That is, the closure plate 260 may be utilized for the same purpose and function in a centrally located bypass duct as illustrated in the Kinsell et al U.S. Pat. No. 4,352,273. In such instance, the anti-icing features of air bearing exhaust manifold 232 may be equally utilized by moving the chamber 232 into alignment with the bypass duct, wherever it may be.

Figure 9:
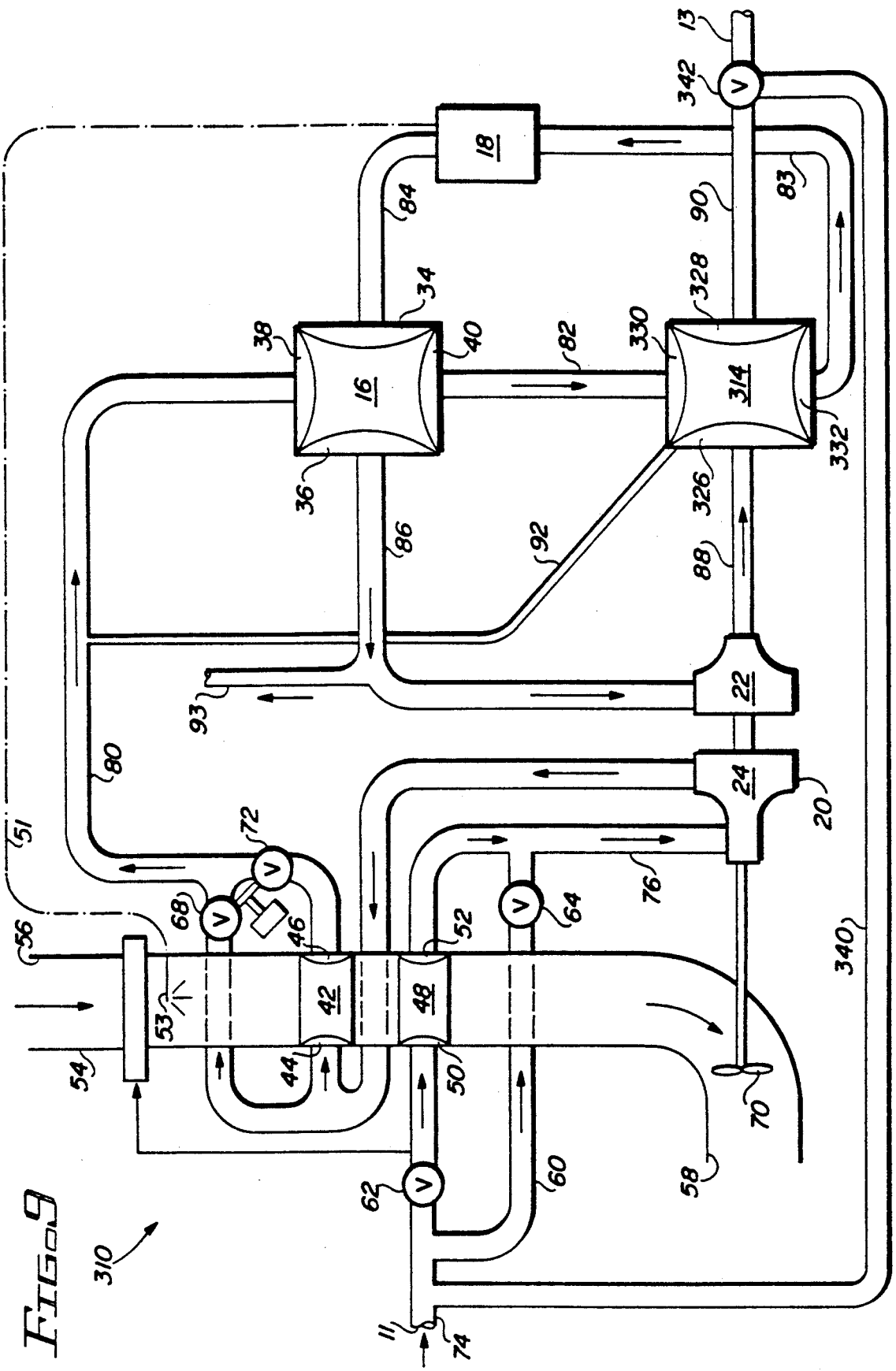
FIG. 9 is a view similar to FIG. 1 but showing an alternate fluid conditioning system embodying an alternate heat exchanger 314.

An alternate arrangement of environmental control system 310 is illustrated in FIG. 9. As denoted by common reference numerals the vast majority of elements in system 310 are like in structure and function to the system 10 illustrated in FIG. 1. As described in greater detail below, however, the heat exchange 314 has alternate structure to the heat exchange means 14 illustrated with respect to FIGS. 1-8. Additionally, the system 310 is distinct in the absence of filter 91, and the associated bypass around heat exchanger 16. Further, the arrangement in the system 310 includes an overall bypass passage 340 extending from inlet 11 to outlet 13 and interconnecting with the latter via a schematically illustrated control valve 342. Characteristically the FIG. 9 environmental control system utilizes the airflow passing through the various heat exchangers 42, 48, 16, 314 and the air cycle machine 20 primarily to produce a low temperature conditioned airflow through outlet 90 to valve 342. Warm airflow through bypass duct 340 is also presented to valve 342 which then may be modulated to mix the airflows from passages 90 and 340 to produce a desired temperature flow output in outlet 13.

Figure 10:
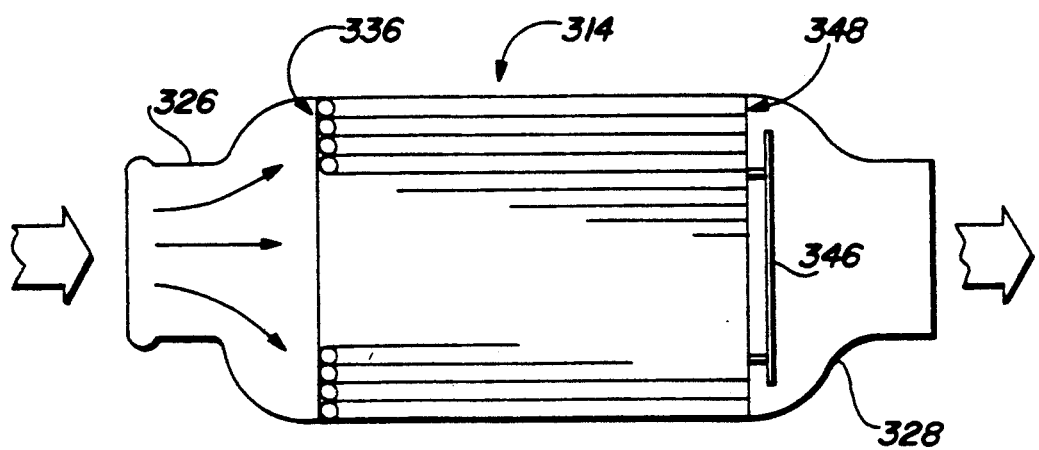
FIG. 10 is a schematic depiction of the heat exchanger 314.

As such, the heat exchanger 314 acts primarily as a condenser for condensing out of the moisture in the warm airflow passing from passage 82 and plenum casing 330 to plenum casing 332 and to passage 83. Heat exchanger 314 is much smaller than its counterpart in FIG. 1 and is not sized to function in a manner of imparting substantial heating to the very cold sub-freezing airflow presented to casing plenum 326 from the outlet of the turbine 22. As depicted in FIG. 10 the heat exchange 314 does not include a bypass passage, such as the bypass passage 254 of the FIG. 1 embodiment. The FIG. 10 arrangement does however include a backpressure plate 346 disposed closely adjacent to the rear face 348 of the heat exchanger core.

In the FIG. 10 arrangement the very cold sub-freezing airflow from the turbine 22 is presented, again in close-coupled relationship as described above with respect to FIG. 1, into outlet plenum casing 326 for flow through the core of the heat exchanger from the front surface 336 to rear surface 348 thereof. Flow exiting the rear face of the core passes through the outlet plenum casing 328 for ultimate delivery toward the valve 342 of FIG. 9. With such an arrangement, the backpressure plate 346 acts similarly to that described above with respect to backpressure plate 246 of the FIG. 1-8 embodiment to minimize the flow velocity stratification at the inlet face 336 of the heat exchanger core. By virtue of elimination or substantial reduction in the flow velocity stratification across such face, tendencies toward icing are reduced as described above with respect to FIG. 1. Additionally, the predictability and reliability of the heat exchanger 314 is far better inasmuch as the flow profile is more evenly distributed throughout the entire volume of the heat exchanger core. Thus, the FIG. 9 arrangement which does not utilize a heat exchanger both for condensation and heating functions, but rather only primarily for condensation, may also reap the benefits of the backpressure plate 346 in the same manner as discussed above with respect to FIG. 1.

Figure 11:
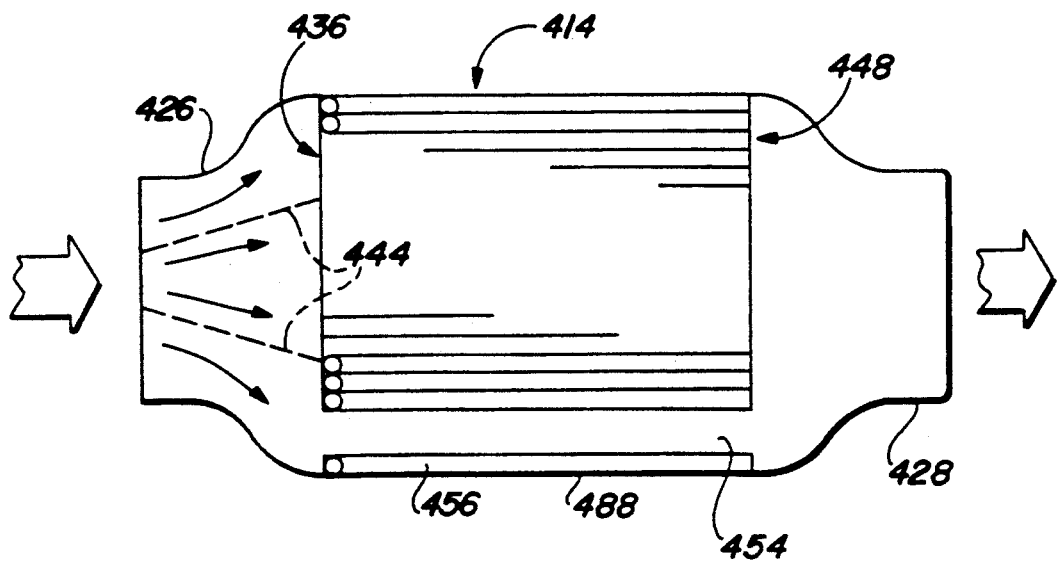
FIG. 11 is a view similar to FIG. 10 but showing another embodiment of heat exchanger 414.

Another embodiment of the present invention is illustrated in FIG. 11. This is another alternative heat exchange structure 414 which may be utilized as an alternative to the heat exchanger 314 of FIG. 9. The heat exchanger 414 of FIG. 11 does not include a backpressure 346 as depicted above with respect with FIG. 10, but does include a bypass passage 454 which is disposed at the extreme side of the heat exchanger core with only a single one pass heat exchange 456 between the bypass passage 454 and the outer surface 458 of the heat exchanger core. In other respects heat exchanger core 414 has features similar to that illustrated in FIG. 10, i.e. an inlet plenum casing 426 leading to a front face 436 of the heat exchanger core, and a corresponding rear face 448 which leads an outlet plenum casing 428.

In the smaller size heat exchange 414 which, like exchanger 314 of FIG. 10, acts primarily only as a condenser, heat exchanger 414 incorporates the benefits of the side located bypass passage 454. That is, because of the side location of bypass 454 out of alignment with the primary high velocity flow distribution received adjacent the inlet face 436 (as graphically depicted by the conical dashed lines 444 in FIG. 11), the velocity profile at the inlet to bypass passage 454 remains relatively constant in comparison to that experienced in the center portion of the heat exchange core. As a result, the bypass ratio flow through passage 454 can remain relatively predictable and constant. The bypass passage 454 further includes the attendant advantages discussed with respect to FIGS. 1-8 of avoidance of ice particle impingement.

Various modifications to the specific embodiments illustrated will be apparent to those skilled in the art. Accordingly, the foregoing detailed description should not be considered as limiting to the scope and spirit of the invention as set forth in the appended claims.

Having described the invention with sufficient clarity that those skilled in the art may make and use it, what is claimed is:

1. A system for conditioning a working fluid to be distributed from a source thereof to a point of use, comprising:

an air cycle machine including a compressor mechanically driven by a turbine, said compressor receiving working fluid from said source and operable to compress and heat the working fluid, said turbine operable to expand and cool the working fluid to subfreezing conditions prior to its delivery to the point of use;

first means for receiving and further cooling the working fluid discharged from said first means;

condenser heat exchange means, receiving working fluid discharged from said reheater means, for condensing vapor entrained in the working fluid, said condenser means receiving the subfreezing working fluid discharged from said turbine to effect said condensing;

separator means, receiving the working fluid and condensed vapor discharged from said condenser means, for separating and removing the condensed vapor from the working fluid, at least a portion of the working fluid discharged from said separator means being directed through said reheater means to effect said further cooling of the working fluid discharged from said first means, and substantially all of the working fluid discharged from the separator means being delivered to said turbine;

a hot air passage extending from a location upstream of said compressor to a second location downstream of said condenser heat exchange means;

control means at said second location for controlling the ratio of cold air from said turbine and hot air from said hot air passage to be delivered to the point of use, whereby substantially only the cold air portion of working fluid delivered to the point of use passes through said turbine and said condenser heat exchange means;

said condenser heat exchange means defining a core having first and second passageways arranged for heat exchange between the fluids therein, and further including:

first inlet and outlet plenum chambers at opposite inlet and outlet faces of said core, said first inlet and outlet plenum chambers communicating with said first passageway, said first inlet plenum chamber receiving the subfreezing working fluid discharged from said turbine and being sufficiently close-coupled to said turbine to produce a substantial stratification of flow velocity of he subfreezing working fluid impinging upon aid inlet face of the core, said first outlet plenum chamber receiving and collecting the working fluid discharged from the first passageway for delivery thereof to said control means;

second inlet and outlet plenum chambers communicating with said second passageway, said second inlet plenum chamber receiving the working fluid discharged from said reheater means, and said second outlet plenum chamber receiving and collecting the working fluid discharged from said second passageway for delivery thereof to said separator means; and a thin, solid plate disposed in said first outlet plenum chamber in a position spaced slightly from said outlet face.

2. A system as set forth in claim 1, wherein said plate covers at least 30 percent of said outlet face.

3. A system as set forth in claim 2, wherein said plate covers between 30 percent and 80 percent of said outlet face.

4. A system as set forth in claim 3, wherein said plate covers about 60 percent of said outlet face.

5. A system as set forth in claim 1, wherein said plate is aligned with that portion of the inlet face wherein the highest flow velocities of said subfreezing fluid flow is concentrated.

6. A system as set forth in claim 5, wherein said portion of the inlet face is the center portion thereof.

* * * * *